Oct. 14, 1947.  W. PIRIE  2,429,071
LOADING APPARATUS
Filed March 12, 1943  3 Sheets-Sheet 1
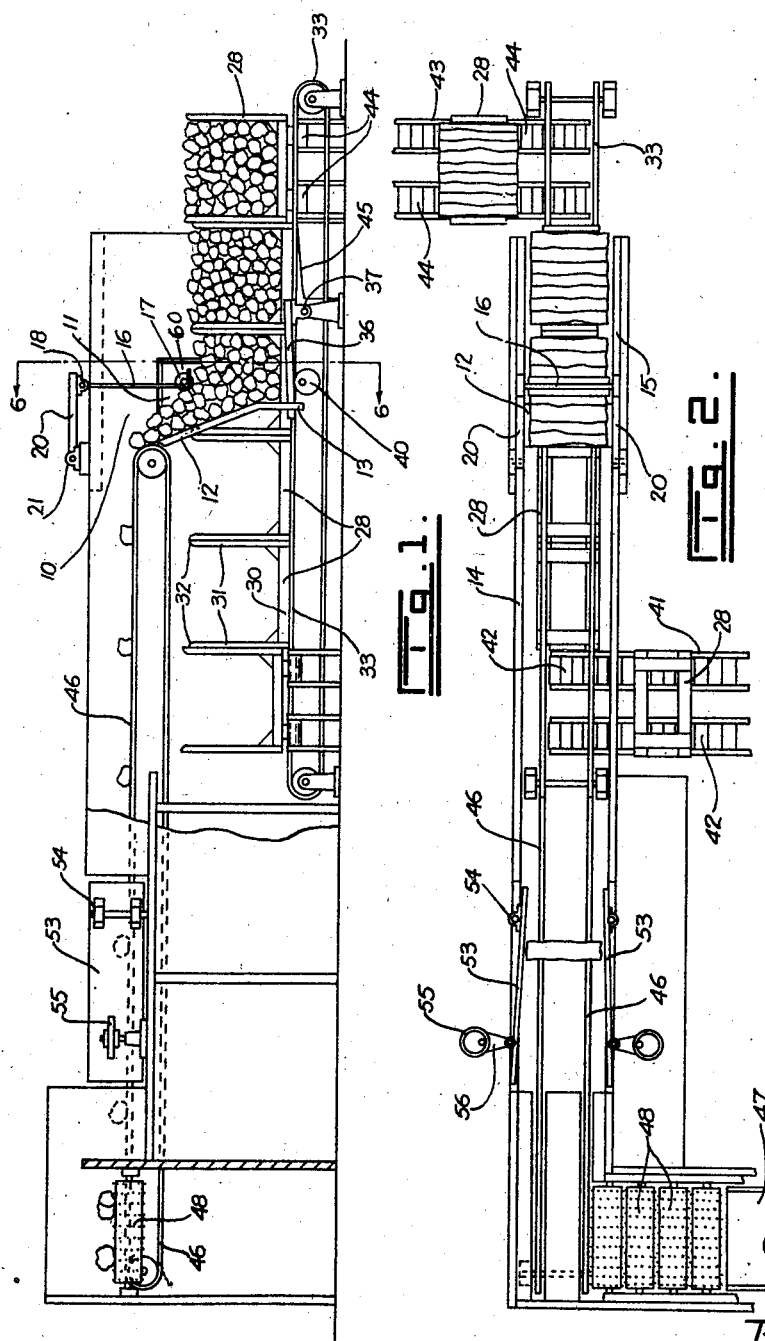
Inventor
WILLIAM PIRIE, DECEASED
BY FREDA PIRIE, EXECUTRIX.
BY Featherston Laughton
Attys.

Oct. 14, 1947.  W. PIRIE  2,429,071
LOADING APPARATUS
Filed March 12, 1943  3 Sheets-Sheet 2

Inventor
WILLIAM PIRIE, DECEASED
BY FREDA PIRIE, EXECUTRIX.

BY *Fetherston Laughlin & Co*
Att'ys.

Oct. 14, 1947.　　　　W. PIRIE　　　　2,429,071
LOADING APPARATUS
Filed March 12, 1943　　　3 Sheets-Sheet 3

Inventor
WILLIAM PIRIE, DECEASED
BY FREDA PIRIE, EXECUTRIX.

Patented Oct. 14, 1947

2,429,071

UNITED STATES PATENT OFFICE 2,429,071

LOADING APPARATUS

William Pirie, deceased, late of Powell River, British Columbia, Canada, by Freda Pirie, executrix, Vancouver, British Columbia, Canada Application March 12, 1943, Serial No. 478,948
In Canada June 10, 1941

9 Claims. (Cl. 226—2)

This invention relates to apparatus for loading blocks into suitable receivers.

An object of the present invention is the provision of apparatus for straightening out and lining up blocks for loading purposes.

Another object is the provision of apparatus for loading blocks on to suitable conveyances.

Another object is the provision of apparatus for automatically loading blocks into receivers and shaking them down properly to pack them into available space.

Another object is the provision of apparatus for loading and packing blocks into continuously moving conveyances.

A further object is the provision of apparatus for lining up blocks and loading them into suitable receivers without disturbing the alignment thereof.

This apparatus is particularly designed for loading blocks of wood on to certain conveyances, known as skips, but it is to be understood that it may be used for loading any kind of suitably shaped material on to any type of conveyance or movable receiver, such as freight cars, trucks, or the like or it may be used for loading the material into suitable stationary receivers, such as hoppers, in which case the apparatus may be movable.

Figure 3:
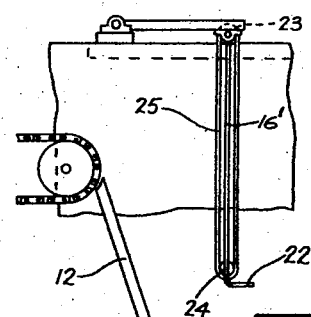
Figure 5:
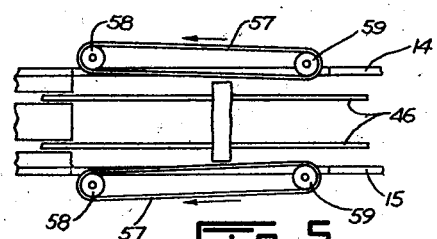
Figure 4:
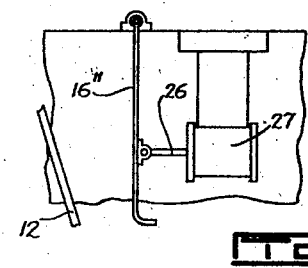
Figure 6:
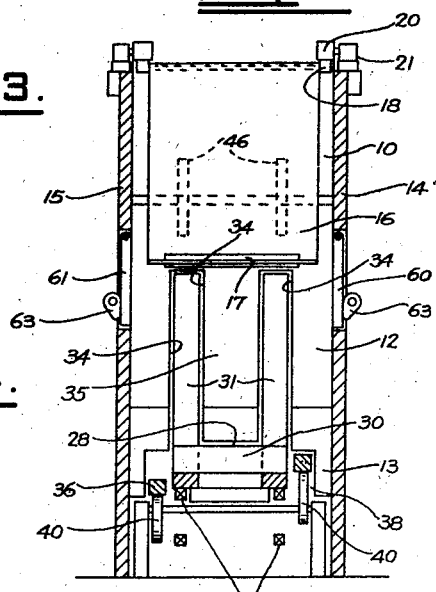
Figure 7:
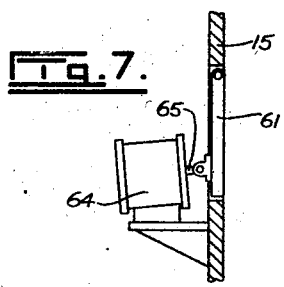
Figure 8:
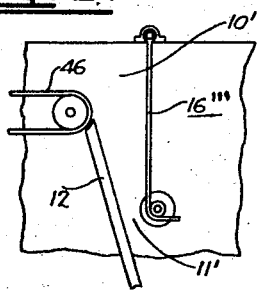
Figure 9:
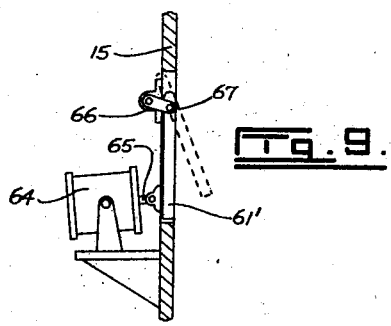
Figure 10:
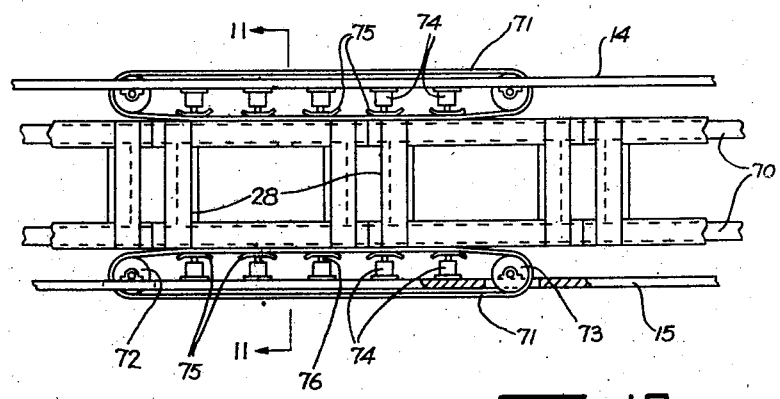
Figures 11, 12:
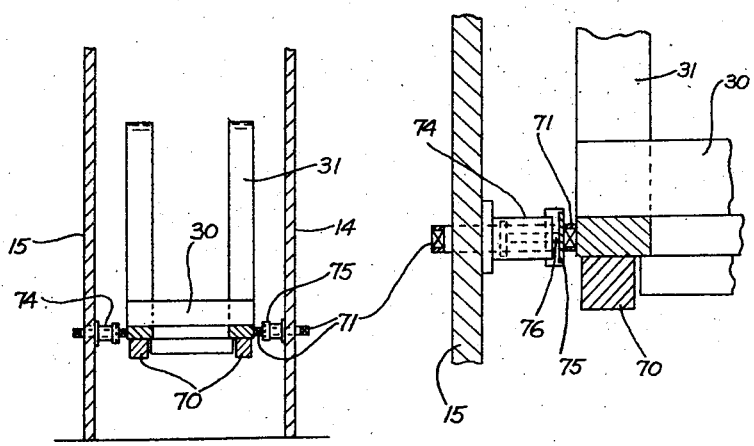

With the above and other objects in view, the present invention consists essentially of a loading apparatus for blocks or the like comprising a hopper, a discharge outlet at the bottom thereof, means for supplying blocks to the hopper, said hopper being adapted to direct the blocks into receivers as each receiver comes beneath its discharge outlet, and means for retaining the blocks in alignment as they are piled in the receivers, as more fully described in the following specification and illustrated in the accompanying drawings, in which Figure 1 is a side elevation of the apparatus showing one form of swinging plate and with the near side wall broken away, Figure 2 is a plan view of this apparatus, Figure 3 illustrates an alternative from of swinging plate, Figure 4 shows another alternative swinging plate, Figure 5 is a plan view of an alternative aligning mechanism to that shown in Figure 1, Figure 6 is a vertical section taken on the line 6—6 of Figure 1, Figure 7 is an enlarged fragmentary section through a wall of the hopper showing an alternative mechanism therein, Figure 8 is a side elevation of another form of hopper for the apparatus, Figure 9 is an enlarged fragmentary section through a wall of the hopper showing another alternative mechanism therein, Figure 10 is a plan view of an alternative mechanism for moving the receivers beneath the hopper, Figure 11 is a cross section taken on the line 11—11 of Figure 10, and Figure 12 is an enlarged detail of this alternative mechanism.

Referring to the drawings, 10 indicates discharge means which may be regarded as being a hopper constituted by the inclined guide plate or chute 12, side walls 14 and 15 and a swinging plate 16, the space between the lower end of the swinging plate and the guide plate 12 constituting the discharge outlet of the hopper. The guide plate 12 extends downwardly from the outlet 11 and has a short vertical section 13 at its lower end which assists in the stacking of the blocks in the receivers, as hereinafter described.

The walls 14 and 15 as well as forming the sides of the hopper extend adjacent to the guide plate 12 and thereby constitute a chute.

For convenience in reference the term "hopper" will be hereafter applied to the elements constituted by the upper part of the guide plate 12, the swinging plate 16 and the side walls 14 and 15. The term "chute" will be applied either to the guide plate 12 alone or in combination with the side walls 14 and 15.

The lower end of the swinging plate 16 may curve away from the hopper or it may have a roller 17 mounted thereon, as shown in Figure 1. This plate is hingedly mounted in any suitable manner, such as by means of a hinge 18 carried by a substantially horizontal support 20, which, in turn, is preferably hinged at its opposite end at 21, although the support 20 may be fixed, if desired.

An alternative form of swinging plate is illustrated in Figure 3. In this example, the lower end 22 of the plate 16' is curved away from the hopper, sprockets 23 and 24 are mounted at the top and the bottom, respectively, of the plate, and an endless chain 25 extends around these sprockets, one side of the chain being located in front of the plate, that is, in the hopper 10, while the other side thereof is positioned in the rear of the plate. Suitable means, not shown, is provided for rotating the chain 25 around the sprockets.

Another example of swinging plate is shown in Figure 4. This plate 16" is hinged at its upper end and it has a piston rod 26 pivotally connected to its rearward surface adjacent the lower end thereof. The piston rod is controlled by a piston operating in an air cylinder 27. With this construction, the swinging plate 16" may be held in any adjusted position in relation to the chute 12 and yet said plate is not rigidly held in position but it may be moved against the air cushion formed in the cylinder 27.

The hopper 10 is adapted to direct the blocks or other materials into suitable receivers and in this example, the receivers are bunks or skips 28 each consisting of a base 30 having a pair of supporting arms 31 projecting upwardly from each end thereof, said arms having a bevel 32 at their upper inner corners. In Figures 1 and 2, these skips are placed end to end upon a conveyor 33, consisting of a pair of spaced chains, which move said skips beneath and beyond the hopper 10. The chute 12, which is wider than the skips, may be cut out at its center to permit the skips to pass therethrough or, preferably, a pair of slots 34 are formed therein through which the arms 31 of the skips may pass. The portion 35 between the slots 34 terminates above the lower end of the chute so as to permit the bases 30 of the skips and the conveyor 33 to pass through the chute. The upper ends of the arms 31 just clear the lower edge of the plate 16 as the skips move beneath the hopper 10.

The width of the skips is preferably less than the length of the blocks to be located thereon so that the latter project beyond the sides of the skips. Suitable means is provided for agitating or shaking the blocks as they are being deposited in each skip. One method of doing this is by means of shaker bars 36 located on each side of the conveyor 33 adjacent the chute 12 and on a level with the bases 30 of the skips. These bars lie substantially parallel to the conveyor and are pivotally mounted at one end on a shaft 37 while the opposite ends thereof extend freely into a slot 38 formed in the lower ends of the vertical sections 13 of the chute. The free ends of the bars are supported by eccentrics 40 which are rotated by any suitable means (not shown). As the eccentrics rotate, the shaker bars are oscillated in a vertical plane and they raise and lower the over-hanging ends of the blocks of the skip beneath the hopper 10. As shown more particularly in Fig. 6, the eccentrics may be opposed to each other, that is, the opposite ends of the bars may be raised or lowered alternately to each other so that the blocks are raised at one side of the skip and lowered at the other.

A storage section 41 is provided for the empty skips adjacent the receiving end of the conveyor 33 and it retains the skips parallel to the conveyor. A plurality of rollers 42 are provided which slope downwardly towards the conveyor. A similar storage section 43 is located beyond the hopper 10 and consists of a plurality of rollers 44, the axis of which lie parallel to the conveyor. A ramp 45 is positioned between the chains of the conveyor 33 adjacent the storage section 43. After each skip is filled, it continues to move forwardly and is forced up the ramp 45 which raises it to the level of the bearing surfaces of the rollers 44. The filled skip is then rolled into the storage section.

While the storage sections 41 and 43 have been shown, it is to be understood that they may be omitted. In fact, the skips may be provided with wheels of their own and moved beneath the hopper 10 in a train.

The blocks are directed to the hopper 10 in any suitable manner such as by a feed conveyor 46. It is preferable that the blocks lie parallel to each other with their ends substantially in line and this may be accomplished in any desired manner, such as illustrated in the drawings. The blocks are directed by a conveyor or chute 47 to a plurality of driven spiked rolls 48 located at the ends of the chute, which turn the blocks more or less in the same direction and parallel to each other. The blocks are deposited on the conveyor 46 which operates at right angles to the chute 47 and the latter carries them between a pair of vertical aligning plates 53, one on each side of the conveyor, before they reach the hopper. These plates are pivoted at 54 at their rearward ends and they are oscillated in any suitable manner, such as by cams 55 which reciprocate cam rods 56, said rods being pivotally connected to the plates adjacent their free ends. The cams are rotated by suitable means (not shown) and they are set so that the free ends of the plates move towards and away from the conveyor 46 in unison so that these plates align the blocks on the conveyor with their ends substantially in line with each other. In this way, the blocks are directed to the hopper 10 in parallel and aligned relationship.

An alternative aligning mechanism is illustrated in Figure 5. In this example, an endless chain 57 is located on each side of the conveyor 46. Each chain extends around sprockets 58 and 59. The sprockets 59 are positioned adjacent the rearward end of the conveyor while the sprockets 58 are spaced outwardly from said conveyor so that the chains 57 lie at an angle thereto and converge towards its rearward end. Suitable means (not shown) is provided for rotating the chains 57 around their respective sprockets. In this case, the converging chains align the blocks on the feed conveyor 46.

If desired plates 60 and 61 may be hingedly mounted at their upper edges in the side walls 14 and 15, respectively, of the hopper, see Figure 6, just above the level of the free ends of the swinging plate 16. Suitable means is provided for moving the lower or free edges of these plates into the hopper in unison. In Figure 6, cams 63 are provided for moving the free edges of the plates 60 and 61 inwardly, while in Figure 7, air or hydraulic cylinders 64 are shown for this purpose, each having a piston therein connected to a piston rod 65 which, in turn, is pivotally connected to the adjacent plate. The plates 60 and 61 are adapted to be swung inwardly in unison to grip the blocks in the bottom of the hopper.

Figure 9 illustrates an alternative form of apparatus for operating the plates 60 and 61, the latter plate being used for the illustration. In this case, the plate 61' is not hingedly mounted on the wall 14 but it is carried adjacent its upper end by crank arms 66, to which the plate 61' is pivotally connected at 67. Suitable means (not shown) is provided for turning the crank arms 66 a limited distance. With this arrangement, the free ends of the plates are swung inwardly to grip the blocks in the hopper 10 while the upper ends of the plates swing clear of the walls 14 and 15. Then the crank arms 66 are turned slightly to raise the plates along with the blocks gripped thereby.

In Figure 1, the distance between the lower end of the plate 16 and the chute 12 is sufficient to permit several blocks to pass therebetween at once, but in Figure 8, this distance is less so that there is only enough room to permit fewer blocks to pass between the plate 16''' and the chute.

Figures 10 to 12 illustrate an alternative mechanism for moving the skips instead of the conveyor 33 of Figure 1. In this example, the skips are moved along rails 70 by endless chains 71, one on each side of the rails. Each chain 71 runs around sprockets 72 and 73, one or both of which are driven by a suitable source of power (not shown). Inside each chain is located one or more air or hydraulic cylinders 74, each having a slide 75 mounted on the outer end of its piston rod 76. The slide or slides 75 bear against the inner surface of that portion of the chain adjacent the skips so that the chain is pressed against the skips to move the latter along the rails 70 with the chain. In this way, the skip between the chains 71 is moved forward and moves all the skips ahead thereof in the same direction.

The operation of this apparatus is as follows:

The blocks are directed by the conveyor or chute 47 to the spiked rolls 48 which turn them more or less in the same direction and parallel to each other, in which condition they are discharged on to the receiving conveyor 46 and lie transversely thereof. This conveyor moves the blocks between the aligning plates 53 and these press against the opposite ends thereof to bring said blocks into alignment. If the endless chains 57 of Figure 5 are substituted for these plates, they serve the same purpose. The blocks are then directed in their parallel and aligned condition to the hopper 10.

The hopper of Figure 1 is large enough to accommodate a large number of blocks at once. These blocks pile up in the hopper and drop through the discharge outlet 11 thereof along the chute 12 into the skip 28 beneath the hopper since a portion of the chute straddles said skip. The speed at which the skips pass through the hopper 11, in conjunction with the speed of delivery of the blocks to said hopper by the conveyor 46, determines the rate of loading. This rate of loading may be changed or stopped by the operator. Should the skips stop moving, the blocks merely pile up in the hopper and along the conveyor 46. The moment the tops of the forward pair of supporting arms 31 of a skip pass through the slots 34 of the chute 12, some of the blocks sliding down said chute, begin to be deposited in this skip. As the skip progresses forwardly, more and more of the blocks of the hopper are directed thereinto until it is filled. The heavy swinging plate 16 moves across the top of the load and prevents the blocks from piling above a certain point. The blocks are maintained in their aligned positions as they are deposited in the skips. In the meantime, the shaker bars are raising and lowering the overhanging ends of the blocks, thus vibrating and shaking down these blocks while they are being piled in the skip. It will be noted that each skip begins to receive blocks before the preceding skip is completely filled.

The curved lower end or the roller 17 of the plate 16 helps said plate to ride over the top of the loaded skips. If the blocks tend to jam in the hopper 10, the plate 16 gives way to release the pressure and this usually releases the jammed blocks. In the case of an excessive jam, the support 20 may be raised by the blocks to release the pressure.

If the plate shown in Figure 3 is used, the moving portions of the chains 25 in the hopper assist greatly in preventing jamming.

The plate 16'' of Figure 4 may be set by means of the piston in the cylinder 27 in any desired position to adjust the size of the discharge outlet 11 of the hopper and to regulate the flow of blocks therethrough. This is accomplished by directing air to the desired side of the piston in said cylinder. At the same time, the plate is not held rigidly so that it may be pivoted outwardly against the air cushion in the cylinder, when the pressure in the hopper becomes too great.

If desired, the plates 60 and 61 of Figure 6 may be used in the side walls of the hopper. These are provided for use in case the blocks become so jammed in the hopper that the movement thereof is stopped and the mere movement of the plate 16 will not release the pressure. When this occurs, the lower edges of the plates 60 and 61 may swing into the hopper in unison to grip the blocks therebetween. These plates hold and catch the blocks still being directed into the hopper so that the pressure will not be increased on the jammed blocks. The plates support the blocks until the trouble below can be corrected.

If the plates 60 and 61 are mounted as shown at 61' in Figure 9, they grip the blocks therebetween, as described above, and they raise said blocks slightly when the crank arms 66 rotate. In this way, the plates not only prevent any additional pressure being applied to the jammed blocks, but they raise the blocks in the hopper to release the pressure on said jammed blocks until they are cleared away.

With the alternative construction of Figure 8, the swinging plate 16''' is located quite close to the chute so that there is only sufficient room for a very limited number of blocks to pass through the discharge outlet 11' at a time. Any of the alternatives described in connection with Figure 1 may be used in this modification.

While this invention has been described in connection with skips, it is obvious that it may be used for loading freight cars, trucks, barges or the like, or it may be used for piling blocks, tubes, bars, and rectangular or tubular materials into suitable bins. If desired, the hopper and its associated elements may be portable.

Various modifications may be made in this invention without departing from the spirit thereof or the scope of the claims and, therefore, the exact forms shown are to be taken as illustrative only and not in a limiting sense, and it is desired that only such limitations shall be placed thereon as are disclosed in the prior art or are set forth in the accompanying claims.

What is claimed as the invention is:

1. Loading apparatus for blocks and the like comprising discharge means adapted to discharge a series of blocks substantially parallel to each other, an open-sided receiver for the blocks movable below the discharge means, the ends of said blocks being adapted to extend beyond the sides of the receiver, a guiding member having a portion thereof arranged to project into the receiver as it moves below the discharge means and adapted to receive the blocks from the said means and guide them into position in the receiver, said guiding member being in the form of a plate having an upper inclined portion and a lower vertical portion, and shaking members on opposite sides of the receiver to agitate the overhanging ends of the blocks therein.

2. Loading apparatus as claimed in claim 1 in which the guiding member has portions extending on both sides of the receiver.

3. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, a horizontal support pivotally mounted at one end above the hopper, and a heavy vertical plate swingably suspended from the free end of said support at the rear of the hopper and terminating adjacent its outlet, said plate riding over the top of the loaded receiver to level off the load therein.

4. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, a heavy vertical plate swingably suspended at the rear of the hopper and terminating adjacent its outlet, sprockets mounted at the top and bottom of the plate, and an endless chain extending around said sprockets adapted to be moved therearound, said plate riding over the top of the loaded receiver to level off the load therein.

5. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, a heavy vertical plate swingably suspended at the rear of the hopper and terminating adjacent its outlet, and pneumatic means connected to the plate for resiliently retaining the plate in any adjusted position in relation to the chute, said plate riding over the top of the loaded receiver to level off the load therein.

6. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, plates hingedly mounted at one edge in opposite sides of the hopper, and means for selectively moving the free edges of the plates into the hopper in unison to grip some of the blocks therein.

7. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, plates hingedly mounted at their upper edges in opposite sides of the hopper, means for selectively moving the free edges of the plates into the hopper in unison to grip some of the blocks therein, and means for raising the plates with the blocks gripped therebetween.

8. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, a heavy vertical plate swingably suspended at the rear of the hopper and terminating adjacent its outlet, said plate riding over the top of the loaded receiver to level off the load therein, plates hingedly mounted at one edge in opposite sides of the hopper, and means for selectively moving the free edges of the plates into the hopper in unison to grip some of the blocks therein.

9. Loading apparatus for blocks or the like comprising a hopper having a discharge outlet at the bottom thereof, a receiver adapted to be moved beneath the hopper, a chute extending downwardly from the bottom of the hopper for directing blocks therefrom into the receiver as it comes beneath the discharge outlet thereof, a heavy vertical plate swingably suspended at the rear of the hopper and terminating adjacent its outlet, said plate riding over the top of the loaded receiver to level off the load therein, plates hingedly mounted at their upper edges in opposite sides of the hopper, means for selectively moving the free edges of the plates into the hopper in unison to grip some of the blocks therein, and means for raising the plates with the blocks gripped therebetween.

FREDA PIRIE,
*Executrix of the Last Will and Testament of William Pirie, Deceased.*

REFERENCES CITED

The following references are of record in the file of this patent:

UNITED STATES PATENTS

| Number | Name | Date |
|---|---|---|
| 398,651 | Peters | Feb. 26, 1889 |
| 589,873 | Strouse | Sept. 14, 1899 |
| 806,487 | Parker | Dec. 5, 1905 |
| 831,905 | Thom | Sept. 25, 1906 |
| 904,394 | Young et al. | Nov. 17, 1908 |
| 1,196,442 | Eick | Aug. 29, 1916 |
| 1,236,753 | Paridon | Aug. 14, 1917 |
| 1,300,762 | Paridon | Apr. 15, 1919 |
| 1,649,639 | Wright | Nov. 15, 1927 |
| 1,838,132 | Beutel et al. | Dec. 29, 1931 |
| 2,091,505 | Griffith | Aug. 31, 1937 |
| 2,294,121 | Lindner | Aug. 25, 1942 |
| 2,322,747 | Shand | June 29, 1943 |
| 2,348,400 | Manspeaker | May 9, 1944 |
| 2,351,693 | Molins et al. | June 20, 1944 |